United States Patent
Cheng et al.

(10) Patent No.: US 10,251,201 B2
(45) Date of Patent: Apr. 2, 2019

(54) COMMUNICATION DEVICE AND A METHOD THEREIN FOR DETERMINING A CONTENTION WINDOW SIZE IN A COMMUNICATION NETWORK

(71) Applicant: Telefonaktiebolaget LM Ericsson (Publ), Stockholm (SE)

(72) Inventors: Jung-Fu Cheng, Fremont, CA (US); Sorour Falahati, Stockholm (SE); Du Ho Kang, Sollentuna (SE); Havish Koorapaty, Saratoga, CA (US); Daniel Larsson, Stockholm (SE); Amitav Mukherjee, Santa Clara, CA (US)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 0 days.

(21) Appl. No.: 15/790,131

(22) Filed: Oct. 23, 2017

(65) Prior Publication Data

US 2018/0063871 A1 Mar. 1, 2018

Related U.S. Application Data

(63) Continuation of application No. 15/025,728, filed as application No. PCT/SE2016/050038 on Jan. 22, 2016, now Pat. No. 9,826,555.

(Continued)

(51) Int. Cl.
| | |
|---|---|
| H04W 74/08 | (2009.01) |
| H04L 1/18 | (2006.01) |
| H04L 5/00 | (2006.01) |
| H04W 72/04 | (2009.01) |
| H04W 74/00 | (2009.01) |
| H04W 16/14 | (2009.01) |

(52) U.S. Cl.
CPC ....... *H04W 74/0841* (2013.01); *H04L 1/1893* (2013.01); *H04L 5/0055* (2013.01); *H04W 72/0446* (2013.01); *H04W 74/004* (2013.01); *H04W 16/14* (2013.01); *H04W 74/0808* (2013.01)

(58) Field of Classification Search
None
See application file for complete search history.

(56) References Cited

U.S. PATENT DOCUMENTS

| | | |
|---|---|---|
| 8,155,102 B1 | 4/2012 | Hakola et al. |
| 9,326,157 B1 | 4/2016 | Bhorkar et al. |

(Continued)

OTHER PUBLICATIONS

International Search Report and Written Opinion issued by the International Searching Authority dated Apr. 15, 2016 for International Application Serial No. PCT/SE2016/050038, International Filing Date: Jan. 22, 2016 consisting of 12-pages.

(Continued)

*Primary Examiner* — Alex Skripnikov

(57) ABSTRACT

The disclosed embodiments relate to a method performed by an apparatus and also relate to an apparatus. The method includes transmitting to a communication device a burst including a subframe; receiving from the communication device a HARQ values associated with the subframe; and determining a random backoff contention window size based on the received HARQ values and also based on previously unused HARQ feedbacks. The apparatus is configured to perform the method steps described above.

30 Claims, 9 Drawing Sheets

Related U.S. Application Data

(60) Provisional application No. 62/134,340, filed on Mar. 17, 2015.

(56) References Cited

U.S. PATENT DOCUMENTS

| | | |
|---|---|---|
| 2013/0021982 A1 | 1/2013 | Kim et al. |
| 2013/0182569 A1 | 7/2013 | Bertrand et al. |
| 2014/0023051 A1 | 1/2014 | Chen et al. |
| 2014/0293868 A1 | 10/2014 | Levanen et al. |
| 2015/0092652 A1 | 4/2015 | Ramamurthy et al. |
| 2016/0234835 A1 | 8/2016 | Yerramalli |
| 2016/0270100 A1 | 9/2016 | Ng et al. |
| 2018/0175975 A1* | 6/2018 | Um .................. H04L 1/1816 |
| 2018/0184459 A1* | 6/2018 | Kim .................. H04L 5/00 |

OTHER PUBLICATIONS

Ting-Yu Lin, et al., "EARC: Enhanced Adaptation of Link Rate and Contention Window for IEEE 802.11 Multi-Rate Wireless Networks" Published in: IEEE Transactions on Communications, vol. 60(9):2623-2634, Publication Date: Jul. 17, 2012 consisting of 12-pages.

3GPP TSG RAN WG1 Meeting #80, R1-150089 Athens, Greece, Title: "LBT Design for LAA Downlink" Agenda Item: 7.2.3.3, Source: Intel Corporation, Document for Discussion and Decision, Feb. 9-13, 2015 consisting of 8-pages.

3GPP TSG-RAN WG1 Meeting #80, R1-150269, Athens, Greece, Title: "LBT with Exponential Backofl Process for Fair Channel Access," Agenda Item: 7.2.3.2, Source: CableLabs, Document for Discussion and Decision, Feb. 9-13, 2015 consisting of 3-pages.

3GPP TS 36.331 V115.0 (Sep. 2013) 3rd Generation Partnership Project; Technical Specification Group Radio Access Network; Evolved Universal Terrestrial Radio Access (E-UTRA); Radio Resource Control (RRC); Protocol specification (Release 11) Sep. 19, 2013 consisting of 347-pages.

3GPP TS 36.211 V11A.0 (Sep. 2013) 3rd Generation Partnership Project; Technical Specification Group Radio Access Network; Evolved Universal Terrestrial Radio Access (E-UTRA); Physical channels and modulation (Release 11) Sep. 20, 2013 consisting of 120-pages.

3GPP TS 36.213 V11A.0 (Sep. 2013) 3rd Generation Partnership Project; Technical Specification Group Radio Access Network; Evolved Universal Terrestrial Radio Access (E-UTRA); Physical layer procedures (Release 11) Sep. 20, 2013 consisting of 182-pages.

* cited by examiner

*Aggregated bandwidth of 100 MHz*

COMMUNICATION DEVICE AND A METHOD THEREIN FOR DETERMINING A CONTENTION WINDOW SIZE IN A COMMUNICATION NETWORK

CROSS-REFERENCE TO RELATED APPLICATION

This application is a continuation of patent application Ser. No. 15/025,728, filed Mar. 29, 2016, entitled "COMMUNICATION DEVICE AND A METHOD THEREIN FOR DETERMINING A CONTENTION WINDOW SIZE IN A COMMUNICATION NETWORK", which is a U.S. National Stage Application of PCT/SE2016/050038, filed Jan. 22, 2016, entitled "A COMMUNICATION DEVICE AND A METHOD THEREIN FOR DETERMINING A CONTENTION WINDOW SIZE IN A COMMUNICATION NETWORK", which claims priority to and the benefit of the filing date of U.S. Provisional Application No. 62/134,340, filed on Mar. 17, 2015, all of which are incorporated herein by reference in their entirety.

TECHNICAL FIELD

The present embodiments relate to channel access in a license assisted access system wherein spectrum is shared. In particular, they relate to a method and a first communication device for determining/adapting a random backoff contention window size in a communication network.

BACKGROUND

The third Generation Partnership Project (3GPP) initiative called "License Assisted Access" (LAA) has the purposed to allow Long Term Evolution (LTE) device such as a User Equipment (UE) or a eNB base station to also operate in the unlicensed 5 GHz radio spectrum. The unlicensed 5 GHz spectrum is used as a complement to the licensed spectrum. Accordingly, devices connect in the licensed spectrum using a Primacy Cell (PCell) and use Carrier Aggregation (CA) to benefit from additional transmission capacity in the unlicensed spectrum using one or more Secondary Cells (SCell). To reduce the changes required for aggregating licensed and unlicensed spectrum, the LTE frame timing in the PCell is simultaneously used in the SCell.

Regulatory requirements, however, may not permit transmissions in the unlicensed spectrum without prior channel sensing. Since the unlicensed spectrum must be shared with other radios of similar or dissimilar wireless technologies, a so called Listen-Before-Talk (LBT) method is applied. Today, the unlicensed 5 GHz spectrum is mainly used by equipment implementing the IEEE 802.11 Wireless Local Area Network (WLAN) standard. This standard is also known as "Wi-Fi."

The regulations may vary from region to region. For example in Europe, the LBT procedure is under the scope of so-called a harmonized European Standard (EN) regulation also called EN 301.893 produced by European Telecommunications Standard Institute (ETSI). For LAA to operate in the 5 GHz spectrum the LAA LBT procedure should conform to requirements and minimum behaviors set forth in EN 301.893. However, additional system designs and steps are needed to ensure coexistence of Wi-Fi and LAA with EN 301.893 LBT procedures.

In the following a general description of the technologies involved in LAA is presented which include LTE where the spectrum is licensed, and a system employing the LBT procedure e.g. the WiFi or WLAN in order to understand the background of the embodiments herein.

LTE uses OFDM (Orthogonal Frequency Division Multiplexing) in the downlink and single-carrier FDMA (Frequency Division Multiple Access) in the uplink. The basic LTE downlink physical resource may be seen as a time-frequency grid as illustrated in FIG. 1, where each resource element corresponds to one OFDM subcarrier during one OFDM symbol interval. The uplink subframe has the same subcarrier spacing as the downlink and the same number of (Single Carrier) SC-FDMA symbols in the time domain as OFDM symbols in the downlink. The OFDM symbol is also shown including the Cyclic Prefix (CP) and an inter-subcarrier spacing of 15 kHz. A resource element is also indicated.

In the time domain, LTE downlink transmissions are organized into radio frames of 10 ms, each radio frame consisting of ten equally-sized subframes of length Tsubframe=1 ms as shown in FIG. 2. For normal CP, one subframe consists of 14 OFDM symbols. The duration of each symbol is approximately 71.4 µs.

Furthermore, the resource allocation in LTE is described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station or eNB transmits control information informing about which terminals (or UEs) data is transmitted to and upon which radio downlink resource blocks the data is transmitted, in the current downlink subframe. This control signaling usually is transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control (control region) is illustrated in FIG. 3.

The reference symbols shown in FIG. 3 are known as Cell specific Reference Symbols (CRS) and are used to support multiple functions including fine time and frequency synchronization and channel estimation for certain transmission modes.

In LTE there are channels known as the Physical Dedicated Control Channel (PDCCH) and the Enhanced PDCCH (EPDCCH).

Both the PDCCH/EPDCCH are used to carry downlink control information (DCI) such as scheduling decisions and power-control commands. The DCI includes:
  Downlink scheduling assignments, including Physical Downlink Shared CHannel (PDSCH) resource indication, transport format, hybrid-ARQ information, and control information related to spatial multiplexing (if applicable). A downlink scheduling assignment also includes a command for power control of the Physical Uplink Control Channel (PUCCH) used for transmission of hybrid-ARQ acknowledgements in response to downlink scheduling assignments.
  Uplink scheduling grants including a Physical Uplink Shared Channel (PUSCH) resource indication, a transport format, and hybrid-ARQ-related information. An uplink scheduling grant also includes a command for power control of the PUSCH.

Power-control commands for a set of terminals (UEs) as a complement to the commands included in the scheduling assignments/grants.

A PDCCH/EPDCCH carries one DCI message containing one of the groups of information listed above. As multiple terminals (UEs) can be scheduled simultaneously, and each terminal can be scheduled on both downlink and uplink simultaneously, it is possible to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio channel conditions, link adaptation can be used, where the code rate of the PDCCH/EPDCCH is selected by adapting the resource usage for the PDCCH/EPDCCH, to match the radio-channel conditions.

Further, in the LTE system, a UE is notified by the network of downlink data transmission by means of the PDCCH. Upon reception of a PDCCH in a subframe n, a UE (receiver in FIG. 4) is required to decode the corresponding physical downlink share channel (PDSCH) and is required to send ACK/NACK feedback in a subsequent subframe n+k. This is illustrated in FIG. 4.

The ACK/NACK feedback from the UE informs the eNodeB or eNB (transmitter in FIG. 4) whether the corresponding PDSCH was decoded correctly. When the eNodeB detects an ACK feedback, it can proceed to send new data blocks (new TX) to the UE. When a NACK is detected by the eNodeB, coded bits corresponding to the original data block will be retransmitted. When the retransmission (reTX) is based on repetition of previously sent coded bits, it is said to be operating in a chase combining HARQ protocol. When the retransmission contains coded bits unused in previous transmission attempts, it is said to be operating in an incremental redundancy HARQ protocol.

The ACK/NACK feedback is sent by the UE using one of the two possible approaches depending on whether the UE is simultaneously transmitting a physical uplink shared channel (PUSCH):

If the UE is not transmitting a PUSCH at the same time, the ACK/NACK feedback is sent via a physical uplink control channel (PUCCH).

If the UE is transmitting a PUSCH simultaneously, the ACK/NACK feedback is sent via the PUSCH.

LTE supports bandwidths larger than 20 MHz. One important requirement on LTE Rel-10 is to assure backward compatibility with LTE Release 8 (RL-8). This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals.

Therefore, it is necessary to assure an efficient use of a wide carrier also for legacy terminals, i.e. that it is possible to implement carriers where legacy terminals (Rele 8 terminals) can be scheduled in all parts of the wideband LTE Rel-10 carrier. The straightforward way to obtain this would be by means of Carrier Aggregation (CA). CA implies that an LTE Rel-10 terminal can receive multiple CCs, where the CC have, or at least the possibility to have, the same structure as a Rel-8 carrier. CA is illustrated in FIG. 5. A CA-capable UE is assigned a primary cell (PCell) which is always activated, and one or more secondary cells (SCells) which may be activated or deactivated dynamically.

The number of aggregated Component Carries (CC) as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal (e.g. UE) may for example support more downlink CCs than uplink CCs, even though the cell is configured with the same number of uplink and downlink CCs.

In addition, a feature of carrier aggregation is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling; this mapping from (E)PDCCH to PDSCH is also configured semi-statically.

As previously described, in LAA systems a sharing of spectrum is performed wherein LTE which operates at a licensed spectrum and WLAN or WiFi operates at an unlicensed spectrum. In the following the WLAN or WiFi system is briefly described and particularly how the channel is accessed in WLAN systems.

In typical deployments of WLAN, Carrier Sense Multiple Access with Collision Avoidance (CSMA/CA) is used for medium access. This means that the channel is sensed to perform a Clear Channel Assessment (CCA), and a transmission is initiated only if the channel is declared as Idle. In case the channel is declared as Busy, the transmission is essentially deferred until the channel is deemed to be idle. When the range of several Access Points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the Listen-Before-Talk (LBT) mechanism or procedure is shown in FIG. 6.

After a WLAN station A transmits a data frame to a station B, station B shall transmit the ACK frame back to station A with a delay of 16 µs. Such an ACK frame is transmitted by station B without performing a LBT operation. To prevent another station interfering with such an ACK frame transmission, a station shall defer for a duration of 34 µs (referred to as DIFS) after the channel is observed to be occupied before assessing again whether the channel is occupied.

Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

To further prevent a station from occupying the channel continuously and thereby prevent other stations from accessing the channel, it is required for a station wishing to transmit again after a transmission is completed to perform a random backoff.

The PIFS is used to gain priority access to the medium, and is shorter than the DIFS duration. Among other cases, it can be used by stations operating under PCF, to transmit Beacon Frames with priority. At the nominal beginning of each Contention-Free Period (CFP), the AP shall sense the medium. When the medium is determined to be idle for one PIFS period (generally 25 µs), the AP shall transmit a Beacon frame containing the CF Parameter Set element and a delivery traffic indication message element.

It should be mentioned that when the medium becomes available, multiple WLAN stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW]. The default size of the random backoff contention window, CWmin, is set in the IEEE specifications. Note that, collisions may still happen even with this random backoff protocol when they are many stations contending for the channel access. Hence, to reduce continuous collisions, the backoff contention window size CW is doubled whenever the station detects a collision of its transmission up to a limit, CWmax, also set in the IEEE specifications. When a station succeeds in a transmission without collision, it resets its random backoff contention window size back to the default value CWmin.

It should also be mentioned that for a device not utilizing the Wi-Fi (WLAN) protocol, EN 301.893 provides the following requirements and minimum behavior for the load-based clear channel assessment.

1) Before a transmission or a burst of transmissions on an Operating Channel, the equipment (AP or UE) shall perform a CCA check using "energy detect". The equipment shall observe the Operating Channel(s) for the duration of the CCA observation time which shall be not less than 20 µs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately (see point 3 below).

2) If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer. The counter is decremented every time a CCA slot is considered to be "unoccupied". When the counter reaches zero, the equipment may transmit.

3) The total time that an equipment makes use of an Operating Channel is the Maximum Channel Occupancy Time which shall be less than (13/32)×q ms, with q as defined in point 2 above, after which the device shall perform the Extended CCA described in point 2 above.

4) The equipment, upon correct reception of a packet which was intended for this equipment, can skip CCA and immediately proceed with the transmission of management and control frames (e.g. ACK and Block ACK frames). A consecutive sequence of transmissions by the equipment, without it performing a new CCA, shall not exceed the Maximum Channel Occupancy Time.

NOTE: For the purpose of multi-cast, the ACK transmissions (associated with the same data packet) of the individual devices are allowed to take place in a sequence.

5) The energy detection threshold for the CCA shall be proportional to the maximum transmit power (PH) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.).

An example of the LBT mechanism in EN 301.893 is depicted in FIG. 7.

Regarding LAA systems, up to now, the spectrum used by LTE is dedicated to LTE. This has the advantage that an LTE system does not need to care about coexistence with other non-3GPP radio access technologies in the same spectrum and spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum.

With LAA to unlicensed spectrum, as shown in FIG. 8, a UE is connected to a PCell operating in the licensed spectrum and one or more SCells operating in the unlicensed spectrum. In this application we denote a SCell in unlicensed spectrum as LAA secondary cell (LAA SCell). The LAA SCell may operate in DL-only mode or operate with both UL and DL traffic. Furthermore, in future scenarios the LTE nodes may operate in standalone mode in license-exempt channels without assistance from a licensed cell. Unlicensed spectrum may, by definition, be simultaneously used by multiple different technologies. Therefore, LAA as described above may coexists with other systems such as IEEE 802.11 (Wi-Fi or WLAN).

To coexist fairly with the Wi-Fi (WLAN) system, transmission on the SCell shall conform to LBT protocols in order to avoid collisions and causing severe interference to on-going transmissions. This includes both performing LBT before commencing transmissions, and limiting the maximum duration of a single transmission burst. A single transmission burst refers to a transmission by a node performed after a successful channel contention. The maximum transmission burst duration is country-specific and/or region-specific. For example, the maximum burst duration is 4 ms in Japan and 13 ms in Europe according to EN 301.893. An example in the context of LAA using carrier aggregation and LBT is shown in FIG. 9 with different examples for the duration of a transmission burst on the LAA SCell constrained by a maximum allowed transmission duration of 4 ms as an example.

The basic LAA coexistence protocols with fixed random backoff contention window sizes, such as that specified in ETSI EN 301.893, may handle networks with small or moderate number of nodes contending for channel access. Additional measures may be needed to handle cases when a large number of nodes are present in networks operating on the same channels.

The existing random backoff contention window protocol is based on the reception of a single ARQ feedback value (ACK/NACK) that is received after the transmission of a burst of data. In the case of LTE, a first hybrid ARQ (HARQ) protocol is followed instead of a simple ARQ protocol. Thus, multiple retransmissions based on HARQ feedback may be needed before a single ARQ feedback value at the higher layer is generated.

Further, multiple UEs may communicate with an eNB in a single subframe. In addition, a single LAA transmission may be comprised of multiple subframes. Further, a transmission to or from a single UE may have multiple HARQ feedback values. This is the case when e.g. a transmission is a multi-codeword transmission. Thus, there are multiple ways in which multiple feedback values may be received corresponding to a single transmission burst following a successful channel contention. The existing random backoff contention window protocol is not suitable to deal with HARQ feedbacks.

It should also be mentioned that a feature of LTE is that the HARQ feedback is only available after a delay of a fixed predetermined time e.g. 4 ms which corresponds to multiple subframes, whereas in other systems it is assumed that the feedback is available after a very short time interval after the transmission ends and this very short time interval may be shorter that the above delay defined in LTE. These systems do not effectively deal with a system like LTE where the feedback delay is much larger.

SUMMARY

An object according to embodiments herein is to provide a method and an arrangement in a first communication device or a first communication device allowing determination of a random backoff contention window size for the next channel contention based on one or more HARQ feedback values. Hence adaptation/variation of the random backoff contention window size is achieved allowing fair coexistence operation between co-channel LAA and WiFi even when a large number of devices or apparatus are contending the channel access.

Thus, according to an aspect of exemplary embodiments, there is provided a method performed by a first communication device or an arrangement in the first communication device for adapting and/or determining a random backoff contention window size in a licensed assisted access system comprising a primary cell and one or more secondary cells. The method comprising: transmitting at least one burst comprising one or more subframes to one or more second communication devices; wherein the transmission of the at least one burst is preceded by a successful Listen-Before-Talk (LBT) procedure i.e. a channel is determined by the first communication device to be free to transmit the at least one burst. The method further comprises: receiving, for the at least one subframe in the burst, a corresponding HARQ feedback value. The HARQ feedback(s) are received from the at least one second communication device. The method further comprises: determining a random backoff contention window size based on each received HARQ feedback value and further based on previously unused HARQ feedback values available at the first communication device at the time the LBT procedure is performed to access the channel.

According to another aspect of exemplary embodiments, there is provided a first communication device or an arrangement in the first communication device for adapting and/or determining a random backoff contention window size in a licensed assisted access system comprising a primary cell and one or more secondary cells. The first communication device comprises: a transmitter module or transmitter circuit configured to transmit at least one burst comprising one or more subframes to one or more second communication devices; wherein the transmission of at least one burst is preceded by a successful Listen-Before-Talk (LBT) procedure i.e. a channel is determined by the first communication device to be free to transmit the at least one burst. The first communication device further comprises a receiver module or received circuitry configured to receive, for at least one subframe in the burst, a corresponding HARQ feedback value. The HARQ feedback(s) are received from the at least one or more second communication devices. The first communication device further comprises a processing module or processing circuitry or processor configured to determine a random backoff contention window size based on each received HARQ feedback value and further based on previously unused HARQ feedback values available at the first communication device at the time the LBT procedure is performed to access the channel.

An advantage with the present embodiments is to allowing fair coexistence operation between co-channel LAA and WiFi.

DETAILED DESCRIPTION

Briefly described, exemplifying embodiments of a first communication device and a method therein for adapting and/or determining a random backoff contention window size in a licensed assisted access system comprising a primary cell and one or more secondary cells are provided. The first communication device maybe a network node e.g. a base station that is serving a secondary cell (SCell) and a PCell or the first communication device may be a user equipment (UE) configured with one primary cell and at least one SCell.

The embodiments herein teach the determination of a variable random backoff contention window size for LAA SCells using parameters, metrics, signals and procedures that are compatible with and have minimum impacts on LTE specs. The solution describes embodiments by which contention window sizes can be varied based on one or more HARQ feedback values. The embodiments also describe how the contention window size may be varied in this manner while accounting for HARQ feedback delay that could potentially be larger than the length of a subframe or even a transmission burst.

A description of the proposed random backoff contention window variation techniques for LBT protocols will now be described. This is generally applicable for both DL and UL transmissions, for both FDD and TDD systems. In the following, the contention window from which a random backoff counter can be drawn for a new LBT attempt is represented by CW so that the counter drawn falls within [0, CW]. The default random backoff contention window size is denoted by CWmin.

The embodiments address LBT for data (burst) transmissions that are carried for example on the PDSCH or PUSCH. The receiver(s) of a data transmission is configured to provide HARQ feedback to the transmitter to indicate whether the data has been received successfully (ACK) or not (NACK) according to the LTE specs. The random backoff contention window size, CW, is modified by the transmitter (first communication device) based on the HARQ feedback(s). The modifications are based on all the previously unused HARQ feedback received that is available at the time the LBT operation is performed to access the channel. By the receiver(s) is meant one or more second communication devices that provide HARQ feedback to the transmitter device i.e. the first communication device that transmitted the burst.

Figure 1:
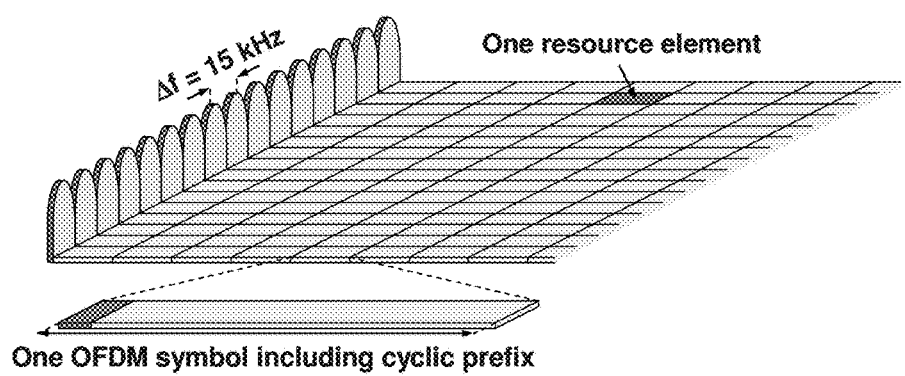
FIG. 1 is a diagram illustrating a known LTE downlink Physical resource.
Figure 2:
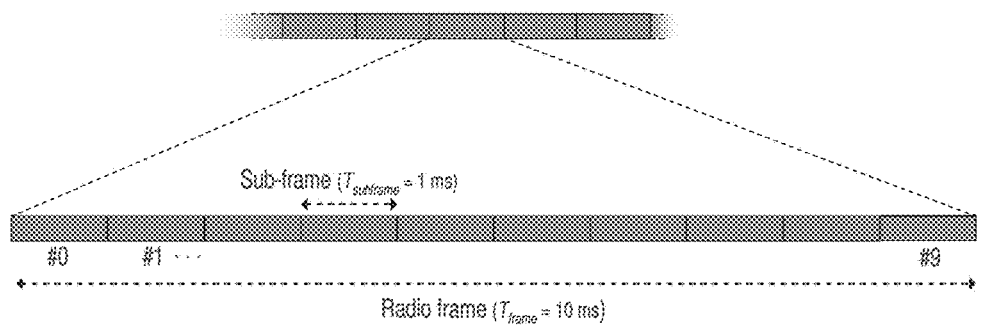
FIG. 2 is a diagram illustrating a known LTE time-domain structure.
Figure 3:
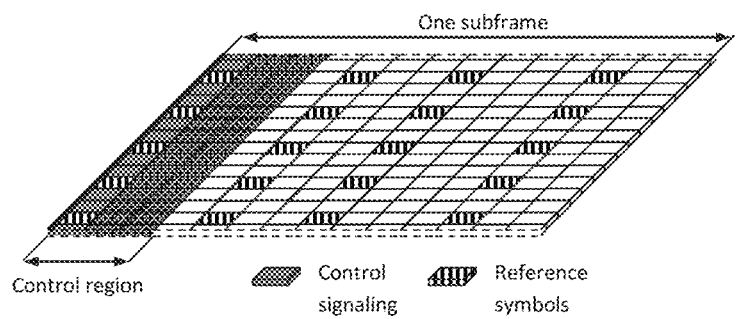
FIG. 3 illustrates a simplified diagram of a downlink subframe in LTE.
Figure 4:
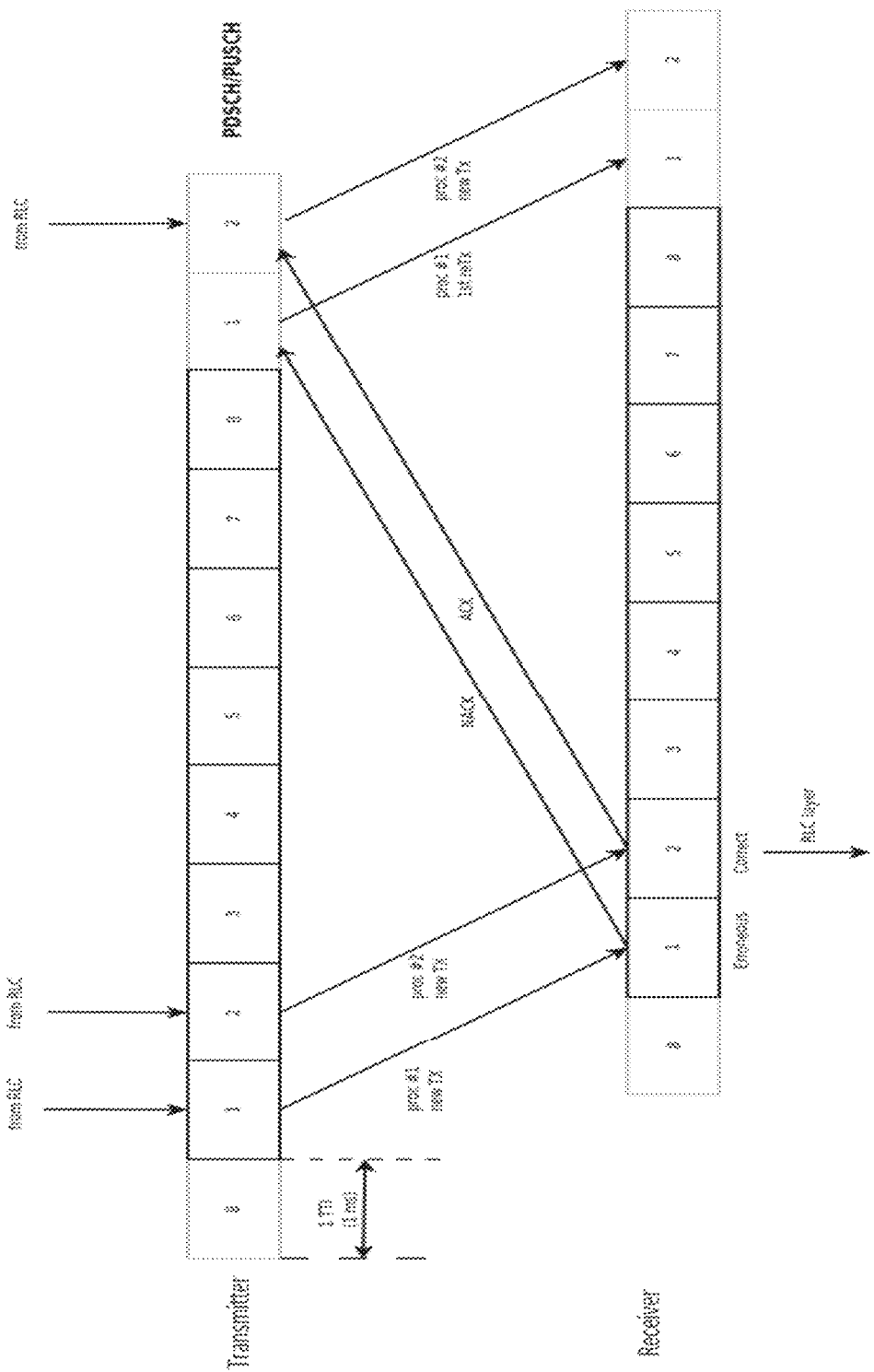
FIG. 4 illustrates an example of HARQ operations in LTE.
Figure 5:
FIG. 5 illustrates an example of carrier aggregation in LTE.
Figure 6:
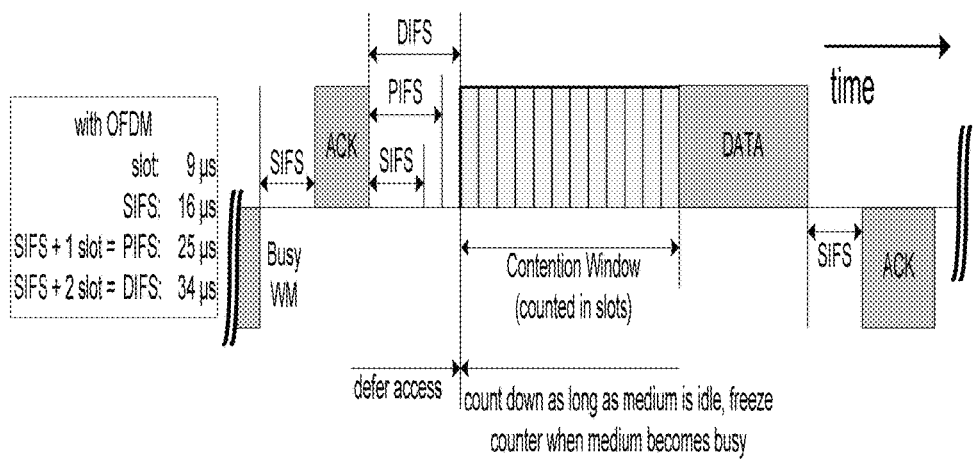
FIG. 6 illustrates a LBT procedure in WiFi system.
Figure 7:
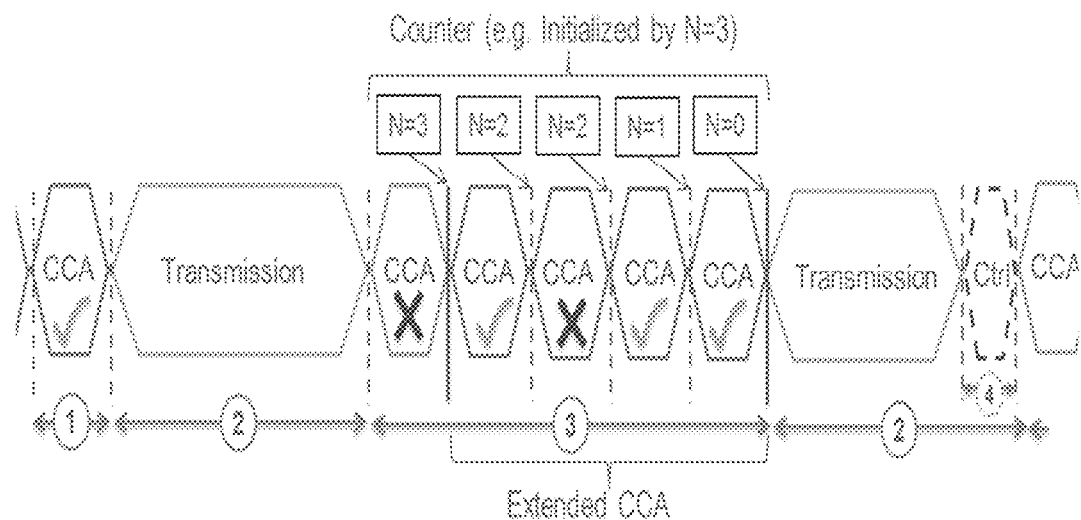
FIG. 7 illustrates LBT in EN 301.893.
Figure 8:
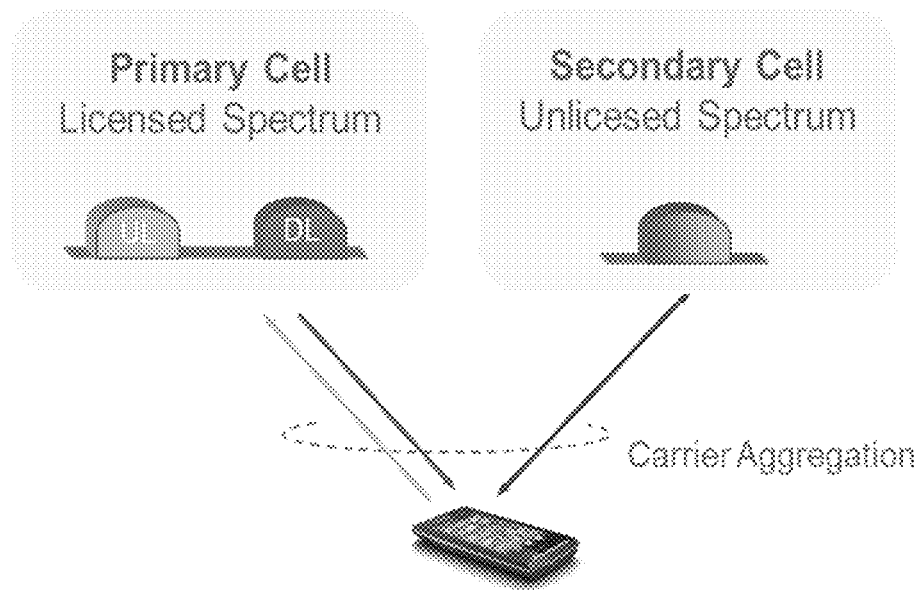
FIG. 8 illustrates a carrier-aggregation capable UE configured with one PCell and one LAA SCell.
Figure 9:
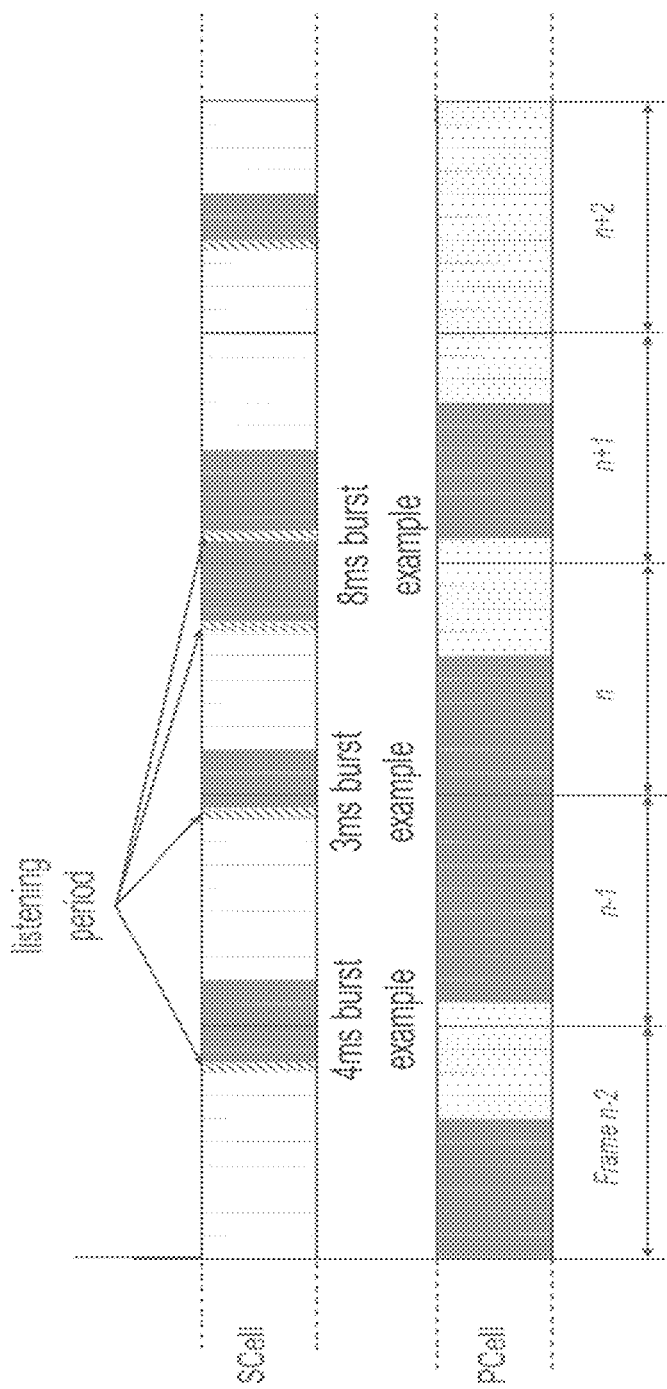
FIG. 9 illustrates LAA to unlicensed spectrum using carrier aggregation and LBT.
Figure 10:
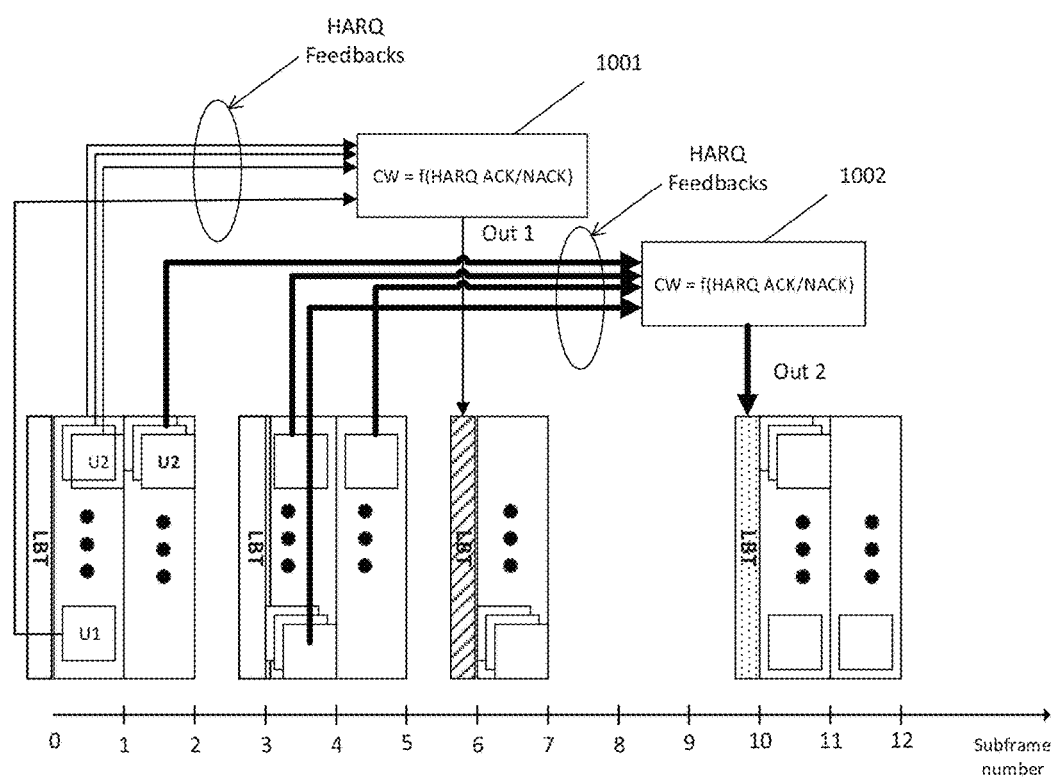
FIG. 10 depicts the use of multiple HARQ feedback values for determining a random backoff contention window size during the LBT procedure according to exemplary embodiments herein.

As previously described a transmission burst refers to a transmission by a first communication device (UE or eNB) performed after a successful channel contention. The transmission burst may include one or more subframes with each subframe having transmissions to one or more second communication devices (UEs or eNBs). The transmissions of the subframe include one or more codewords based on which one or more HARQ feedbacks are transmitted to the first communication device. Each transmission burst is preceded by a successful LBT procedure where the first communication device determines the channel to be free to transmit. Referring to FIG. 10 there is illustrated a scenario showing the use of multiple HARQ feedback values used for determining the random backoff contention window size during a LBT procedure.

A HARQ feedback value for a transmission in a particular subframe is assumed to be available at the first communication device for use in the LBT procedure if that subframe occurs at least (x+1) subframes later. This includes the time x ms for the feedback to be available plus a gap assumed to be less than 1 ms for processing delay. For example in LTE, x may be equal to 4 ms and hence in this case a HARQ feedback value for a transmission in a particular subframe is assumed to be available for use in the LBT procedure by the first communication device if that subframe occurs at least five subframes later.

FIG. 10 shows the contention window for the LBT procedure (dashed) occurring for a transmission burst starting at subframe number 6, using HARQ feedback values from subframe 0. Within subframe 0, a single HARQ feedback is received for User1 (U1) whereas multiple HARQ feedback values are received for the multiple codewords transmitted to User2 (U2). The HARQ feedback values for subframe 1 are, in this example, not available, and therefore are not used even though they belong to the same transmission burst. As shown, the HARQ feedback values are used as input to block 1001 which is configured to determine a random backoff contention window size (Out 1) for the next LBT procedure.

The figure also shows the LBT procedure (dotted) for the next transmission burst which in this example uses the previously unused HARQ feedback value available for the previous burst transmission as well as the HARQ feedback values for the subsequent burst transmission. Here, the feedback values span multiple codewords, users, subframes and transmission bursts. Here the previously unused HARQ feedback value for the previous transmission and the HARQ feedback values for the subsequent burst transmission are used as input to block 1002 for determining a random backoff contention window size (Out 2) for the next LBT procedure.

In the following, combination of multiple HARQ values that may be performed by a first communication device, is explained in accordance with some exemplary embodiments herein.

According to an exemplary embodiment, multiple HARQ values may be combined into a single feedback value. For example, (effective) HARQ values are combined to form a single (effective) NACK if the received HARQ feedback values are all NACK. If all feedback values are instead ACK the combination of the ACKs generate a single ACK value.

In another exemplary embodiment, if a single HARQ value among the received HARQ values is a NACK, the combination results in a single NACK value. In another exemplary embodiment, multiple HARQ feedback values or effective HARQ feedback values are combined to form a single (effective) NACK if the fraction of received HARQ feedback values that are NACK exceeds a certain threshold. Such a threshold is a design parameter.

In another exemplary embodiment, multiple HARQ feedback values or effective HARQ feedback values are combined to form a single effective ACK if the fraction of received HARQ feedback values that are ACK exceeds a certain threshold. Such a threshold is also a design parameter.

It should be mentioned that multiple HARQ feedback values or effective HARQ feedback values may be ordered into a list before being used to determine the contention window size. For example, HARQ feedback values corresponding to multiple codewords for a user (UE) and multiple users (UEs) in a subframe are ordered in decreasing order of the transmission rate as determined by the modulation and coding scheme used for the transmission by the first communication device. HARQ feedback values for different subframes and for different transmission bursts may be ordered in chronological order.

In another exemplary embodiment, HARQ feedback values corresponding to multiple codewords for a user (UE) and multiple users (UEs) in a subframe are ordered in increasing order of the transmission rate as determined by the modulation and coding scheme used for the transmission by the first communication device. The Signal to Noise Ratio (SNR) values if available at the transmitter (first communication device) may also be used for ordering the HARQ values in a list.

In another exemplary embodiment, multiple HARQ feedback values or effective HARQ feedback values that have been ordered according to the example above are combined to form a single effective NACK based on any of the above criteria applied to only the first M subframes in the ordered list of multiple HARQ feedback or effective HARQ feedback values. This includes the case where M=1 so that the combined effective HARQ feedback value is the same as the value of the first HARQ feedback or effective feedback value in the list.

According to an exemplary embodiment, multiple HARQ feedback values may be used differently for different groups of packets in order to determine how the contention window size is varied. For example, for the HARQ feedback values corresponding to the codewords in a Multiple Input Multiple Output (MIMO) transmission, different users in a subframe, users in different subframes and users in different transmission bursts, the HARQ feedback values may all be used differently in determining how the contention window size varies. Some exemplary implementations of this embodiment are described below.

1) HARQ feedback values for different codewords transmitted by the first communication device to a single user (UE) are combined to form an single (effective) HARQ feedback value as previously described, so that there is one HARQ feedback or effective HARQ feedback value per user. The HARQ feedback or effective HARQ feedback values for all users within a subframe are further combined to generate a single effective HARQ feedback value for a subframe. The HARQ feedback values for all the subframes across all the transmission bursts are ordered in a list in chronological order as previously described and used as input to the random backoff contention window size determining algorithms as will be described.

2) In another example, the HARQ feedback values for different codewords for a user are first combined and then the HARQ or effective HARQ feedback value per user in a subframe are combined to generate a single effective HARQ feedback value per subframe as described in the above embodiment. Then, the single values per subframe are further combined, as previously described, to generate a single effective HARQ feedback value per transmission burst. The list of HARQ feedback values or effective values per transmission burst are then ordered in a list in chronological order and used as input to the random backoff contention window size determining algorithms.

3) In a variation of the above exemplary embodiment, the HARQ feedback values in a list of HARQ feedback values or effective values per transmission burst may be combined, to generate a single effective HARQ feedback value that is used to determine the random backoff contention window size.

4) According to another example, HARQ feedback values for different codewords transmitted to a single user (UE) may be combined to form a single effective HARQ feedback value as previously described so that there is one HARQ feedback or effective HARQ feedback value per user. The HARQ feedback values from all the users (UEs) across all subframes and all transmission bursts are ordered in a list without any further combining and used as input to the random backoff contention window determining size algorithms.

5) In another example, HARQ feedback values for all the codewords belonging to all users (UEs) in a subframe are combined to form a single effective HARQ feedback value as described so that there is one HARQ feedback or effective HARQ feedback value per subframe. The HARQ feedback values for all the subframes across all the transmission bursts are ordered in a list in chronological order and used as input to the random backoff contention window size determining algorithms.

6) According to another example, HARQ feedback values for all the codewords belonging to all users (UEs) in a subframe and all subframes in a transmission burst are combined to form a single effective HARQ feedback value as previously described, so that there is one HARQ feedback or effective HARQ feedback value per transmission burst. The HARQ feedback values for all the transmission bursts are ordered in a list in chronological order and used as input to the random backoff contention window size determining algorithms.

7) In another example, HARQ feedback values for all the codewords belong to all users in a subframe, all subframes in a transmission burst and across multiple transmission bursts are all combined to form a single effective HARQ feedback value as described, so that there is one HARQ feedback or effective HARQ feedback value generated. This single HARQ feedback or effective HARQ feedback value is used as input to the random backoff contention window size determining algorithms.

8) In another example, all available HARQ values may be used directly, without any combining or ordering, as input to the random backoff contention window size determining algorithms.

As mentioned above, the HARQ feedback values are used as input to the random contention window size determination algorithm(s) of the first communication device. Below are described examples of such algorithm.

According to an exemplary embodiment the random backoff contention window size when an LBT operation is performed at the start of a transmission burst containing one or more subframes is determined as a function of an ordered list of past HARQ feedback values as previously described. The window size, denoted CW, may thus be viewed as a function of the HARQ feedback values $HARQ_2$, $HARQ_2$, ..., $HARQ_K$ of the ordered list according to:

$$CW = f(HARQ_2, HARQ_2, \ldots, HARQ_K).$$

Where k is the number of the last HARQ feedback value in the list.

In a first non-limiting random backoff contention window size adaptation embodiment, the random backoff contention window size, CW, may be multiplied by a factor of two whenever a NACK feedback is received up to a maximum value of CWmax; and is reset to CWmin whenever an ACK feedback is received. The size of the contention window for performing LBT may in this case be represented as:

$$CW = CW\min \times a^n$$

where the multiplicative factor a is two and n denotes the number of received NACKs after the last received ACK. According to an example, n is set to:

$$n = \text{floor}((\text{number of received NACKs after the last received ACK})/N)$$

where the function floor( ) returns an integer value no greater than the input n. That is, the window size CW is increased by the multiplicative factor a for every N NACK feedback values on average, where N is a parameter that may be used to control the aggressiveness of the LBT algorithm.

In another example, the window size CW may take on forms other than the exponential function e.g.:

$$CW = CW\min \times g(n)$$

where, g(n) may be an m-th order polynomial:

$$g(n) = c_m n^m + c_{m-1} n^{m-1} + \ldots + c_1 n + c_0$$

In another example neither ordering nor combining is performed for the received HARQ feedback values. For example, the HARQ feedback values are treated identically in the contention window size determination/variation algorithm. That is, there is no difference in how HARQ values are processed depending on whether the values belong to the same user, multiple users, multiple subframes etc. For example, the contention window for the ith LBT operation, CW(i)=f(HARQ ACK/NACK) could be defined as follows:

$CW(i) = CW\text{min}$, if NACK_ratio<$T0$ $CW(i) = CW(i-1) \times a^x$, if NACK_ratio$\geq T0$ where the multiplicative factor a is 2, NACK_ratio=(number of HARQ NACKs)/(total no. of available unused HARQ feedback values), T0 is a threshold that can range from 0 to 1 and x is a function of the NACK_ratio. One exemplary implementation for x is given below.

$x=1$, if NACK_ratio$\geq T0$

Another exemplary implementation for x is as follows.

$x = 0$, if $T0 \leq$ NACK_ratio $< T1$ $x = 1$, if $T1 \leq$ NACK_ratio $< T2$

...

$x = m$, if $Tm \leq$ NACK_ratio $\leq 1$

It should be mentioned that different random backoff window sizes may be maintained and adapted for data transmissions and for management and control information transmissions. Non-limiting examples of management and control information transmission are Discovery Reference Signal (DRS) transmissions; Master Information Block (MIB) and/or System Information Block (SIB) signals transmitted by the first communication device.

According to an exemplary embodiment, the random backoff window size for management and control information transmissions may be fixed by the first communication device while the window size for data transmission is determined/adapted by the first communication device based on any of the above described embodiments.

In another non-limiting embodiment, the random backoff window size for management and control information transmissions may be determined/adapted with a growth rate lower than that for data transmissions. As a non-limiting example, the multiplicative factor for management and control information transmissions is set to a smaller value than that for data transmissions. As a second non-limiting example, the random backoff window size for management and control information transmissions is adapted with a polynomial functional form (as previously described) while that for the data transmission is adapted with an exponential functional form (as previously described).

Figure 11:
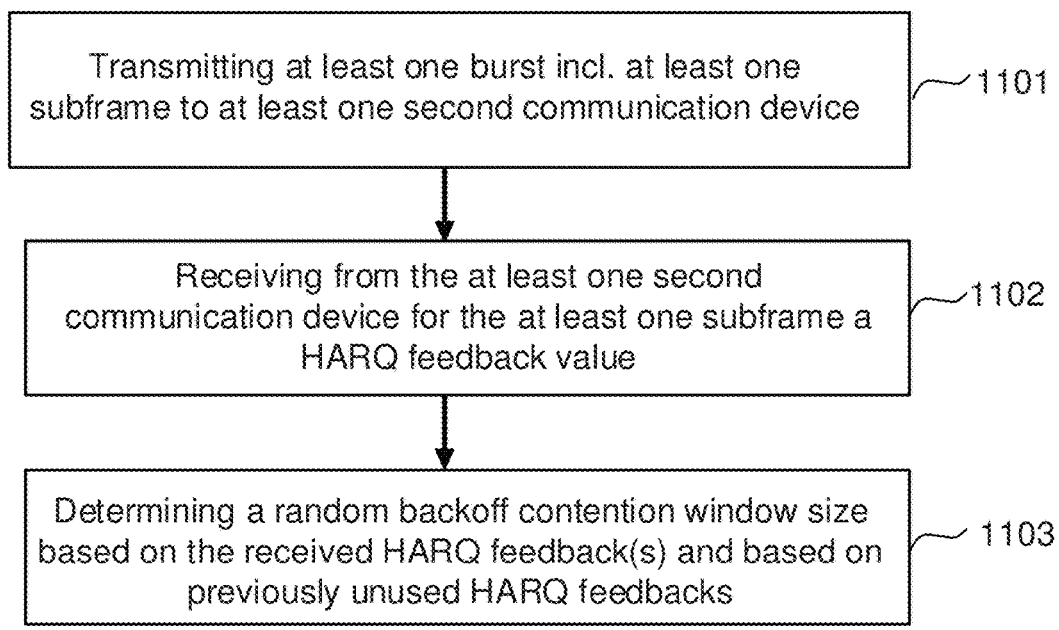
FIG. 11 is a flowchart illustrating the main method steps performed by a first communication device according to the present embodiments.

FIG. 11 is a flowchart illustrating the main method steps performed by a first communication device according to the previously described embodiments.

As shown, the method comprises:

(1101) transmitting at least one burst comprising at least one subframe to one or more second communication devices; wherein the transmission of the at least one burst is preceded by a successful Listen-Before-Talk (LBT) procedure i.e. a channel is determined by the first communication device to be free to transmit the at least one burst;

(1102) receiving, for the at least one subframe of the burst, a corresponding HARQ feedback value. The HARQ feedback(s) are received from the at least one second communication device; and (1103) determining a random backoff contention window size based on each received HARQ feedback and further based on previously unused HARQ feedback values available at the first communication device at the time the LBT procedure is performed to access the channel.

As previously described, the method performed by the first communication device further comprises combining multiple HARQ values. For example, the method comprises: combining (effective) HARQ values to form a single (effective) NACK if the received HARQ feedback values are all NACKs. If all feedback values are instead ACKs the method comprises combining the ACKs to generate a single ACK value.

In another exemplary embodiment, the method comprises combining the results in a single NACK value if a single HARQ value among the received HARQ values is a NACK.

In another exemplary embodiment, the method comprises combining multiple HARQ feedback values or effective HARQ feedback values to form a single effective NACK if the fraction of received HARQ feedback values that are NACK exceeds a certain threshold. Such a threshold is a design parameter.

In another exemplary embodiment, the method comprises combining multiple HARQ feedback values or effective HARQ feedback values to form a single ACK value if the fraction of received HARQ feedback values that are ACK exceeds a certain threshold. Such a threshold is also a design parameter.

It should be mentioned that multiple HARQ feedback values or effective HARQ feedback values may be ordered by the first communication device into a list before being used to determine the contention window size. For example, the method comprises ordering in decreasing order of the transmission rate as determined by the modulation and coding scheme used for the transmission of HARQ feedback values corresponding to multiple codewords for a user (UE) and multiple users (UEs) in a subframe. HARQ feedback values for different subframes and for different transmission bursts may instead be ordered in chronological order by the first communication device.

In another exemplary embodiment, the method comprises ordering in increasing order of the transmission rate as determined by the modulation and coding scheme used for the transmission the HARQ feedback values corresponding to multiple codewords for a user (UE) and multiple users (UEs) in a subframe. The Signal to Noise Ratio values if available at the transmitter (first communication device) may also be used for ordering the HARQ vales in a list In another exemplary embodiment, multiple HARQ feedback values or effective HARQ feedback values that have been ordered according to the example above are combined by the first communication device to form a single effective NACK based on any of the above criteria applied to only the first M subframes in the ordered list of multiple HARQ feedback or effective HARQ feedback values. This includes the case where M=1 so that the combined effective HARQ feedback value is the same as the value of the first HARQ feedback or effective feedback value in the list.

According to an exemplary embodiment, multiple HARQ feedback values may be used differently for different groups of packets/used in order to determine how the contention window size is varied. For example, for the HARQ feedback values corresponding to the codewords in a Multiple Input Multiple Output (MIMO) transmission, different users in a subframe, users in different subframes and users in different transmission bursts, the HARQ feedback values may all be used differently in determining how the contention window size varies. Some exemplary implementations of this embodiment are described below.

1) HARQ feedback values for different codewords transmitted to a single user are combined by the first communication device to form a single effective HARQ feedback value as previously described, so that there is one HARQ feedback or effective HARQ feedback value per user. The HARQ feedback or effective HARQ feedback values for all users within a subframe are further combined to generate a single effective HARQ feedback value for a subframe. The HARQ feedback values for all the subframes across all the transmission bursts are ordered in a list in chronological order as previously described and used as input to the random backoff contention window size determining algorithms as will be described.

2) In another example, the HARQ feedback values for different codewords for a user are first combined by the first communication device and then the HARQ or effective HARQ feedback value per user in a subframe are combined by the first communication device to generate a single effective HARQ feedback value per subframe as described in the above embodiment. Then, the single values per subframe are further combined, as previously described, to generate a single effective HARQ feedback value per transmission burst. The list of HARQ feedback values or effective values per transmission burst are then ordered in a list in chronological order and used as input to the random backoff contention window size determining algorithms.

3) In a variation of the above exemplary embodiment, the HARQ feedback values in a list of HARQ feedback values or effective values per transmission burst may be combined by the first communication device, to generate a single effective HARQ feedback value that is used to determine the random backoff contention window size.

4) According to another example, HARQ feedback values for different codewords transmitted to a single user (UE) may be combined by the first communication device to form a single effective HARQ feedback value as previously described so that there is one HARQ feedback or effective HARQ feedback value per user. The HARQ feedback values for all the users (UEs) across all subframes and all transmission bursts are ordered in a list without any further combining and used as input to the random backoff contention window determining size algorithms.

5) In another example, HARQ feedback values for all the codewords belonging to all users (UEs) in a subframe are combined by the first communication device to form a single effective HARQ feedback value as described so that there is one HARQ feedback or effective HARQ feedback value per subframe. The HARQ feedback values for all the subframes across all the transmission bursts are ordered in a list in chronological order and used as input to the random backoff contention window size determining algorithms.

6) According to another example, HARQ feedback values for all the codewords belong to all users (UEs) in a subframe and all subframes in a transmission burst are combined by the first communication device to form a single effective HARQ feedback value as previously described, so that there is one HARQ feedback or effective HARQ feedback value per transmission burst. The HARQ feedback values for all the transmission bursts are ordered in a list in chronological order and used as input to the random backoff contention window size determining algorithms.

7) In another example, HARQ feedback values for all the codewords belong to all users in a subframe, all subframes in a transmission burst and across multiple transmission bursts are all combined by the first communication device to form a single effective HARQ feedback value as described, so that there is one HARQ feedback or effective HARQ feedback value generated. This single HARQ feedback or effective HARQ feedback value is used as input to the random backoff contention window size determining algorithms.

8) In another example, all available HARQ values may be used by the first communication device directly, without any combining or ordering, as input to the random backoff contention window size determining algorithms.

As mentioned above, the HARQ feedback values are used by the first communication device as input to the random contention window size determination algorithm of the first communication device for determining the window size CW. Below are examples of a method performed by the first communication device to determine CW:

According to an exemplary embodiment the random backoff contention window size when an LBT operation is performed at the start of a transmission burst containing one or more subframes is determined as a function of an ordered list of past HARQ feedback values as previously described. The window size CW may thus be viewed as a function f of the HARQ feedback values $HARQ_2, HARQ_2, \ldots, HARQ_K$ of the ordered list according to:

$$CW = f(HARQ_2, HARQ_2, \ldots, HARQ_K).$$

where k is the number of the last HARQ feedback value in the list.

In another example, the random backoff contention window size adaptation embodiment, the random backoff contention window size, CW, may be multiplied by a factor of two whenever a NACK feedback is received up to a maximum value of CWmax; and is reset to CWmin whenever an ACK feedback is received. The size of the contention window for performing LBT may in this case be represented as:

$$CW = CW\text{min} \times a^n$$

where the multiplicative factor a is two and n denotes the number of received NACKs after the last received ACK.

According to an example, n is set to:

$$n = \text{floor}((\text{number of received NACKs after the last received ACK})/N)$$

where the function floor( ) returns an integer value no greater than the input n. That is, the window size CW is increased by the multiplicative factor a for every N NACK feedback values on average, where N is a parameter that can be used to control the aggressiveness of the LBT algorithm.

In another example, the functional form of the window size adaptation may take on forms other than the exponential function e.g.:

$$CW = CW\text{min} \times g(n)$$

where, g(n) may be an m-th order polynomial:

$$g(n) = c_m n^m + c_{m-1} n^{m-1} + \ldots + c_1 n + c_0$$

In another example neither ordering nor combining is performed by the first communication device for the received HARQ feedback values. For example, the HARQ feedback values are treated identically in the contention window size determination/variation algorithm. That is, there is no difference in how HARQ values are processed depending on whether the values belong to the same user, multiple users, multiple subframes etc. For example, the contention window for the ith LBT operation, CW(i)=f (HARQ ACK/NACK) could be defined as follows:

$CW(i)=CWmin$, if NACK_ratio<T0

$CW(i)=CW(i-1) \times a^x$, if NACK_ratio≥T0 where the multiplicative factor a is 2, NACK_ratio=(number of HARQ NACKs)/(total no. of available unused HARQ feedback values), T0 is a threshold that can range from 0 to 1 and x is a function of the NACK_ratio. One exemplary implementation for x is given below.

$x=1$, if NACK_ratio≥T0

Another exemplary implementation for x is as follows.

$x = 0$, if $T0 \leq$ NACK_ratio $< T1$ $x = 1$, if $T1 \leq$ NACK_ratio $< T2$

...

$x = m$, if $Tm \leq$ NACK_ratio $\leq 1$

Figure 12:
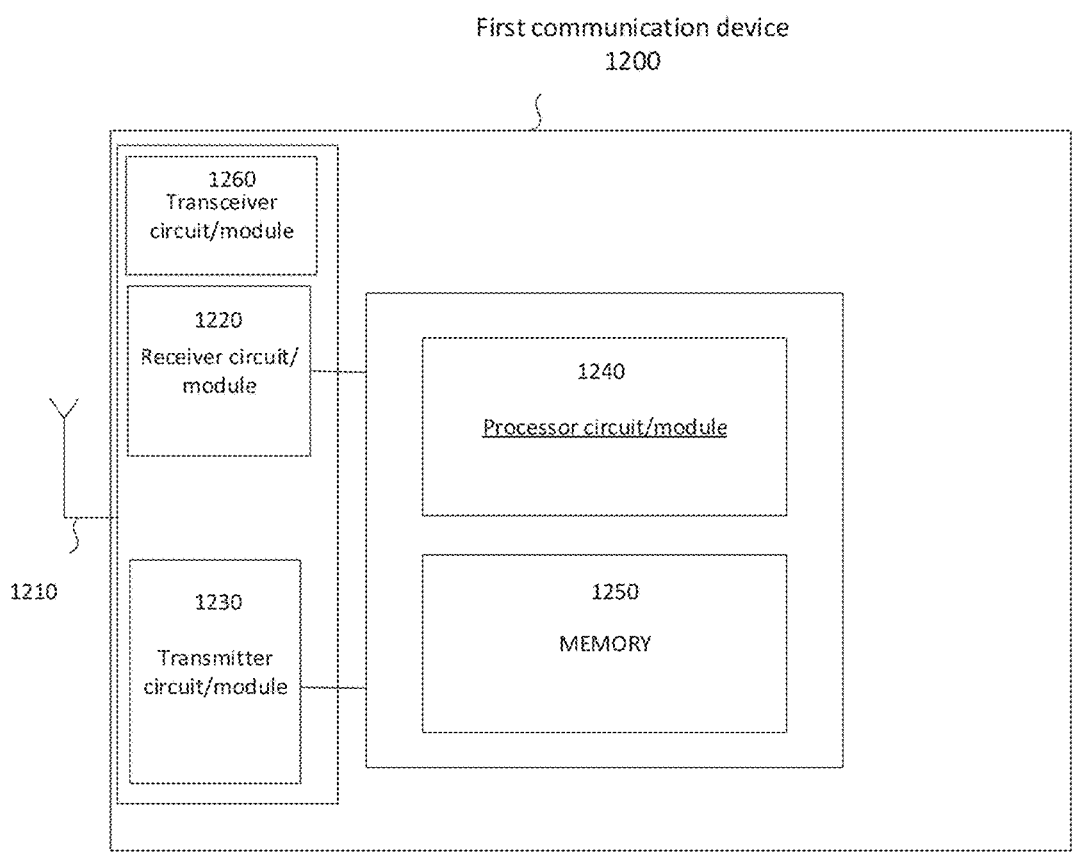
FIG. 12 is a block diagram illustrating a first communication device according to the present embodiments.

Referring to FIG. 12 there is illustrated a block diagram of exemplary components of a first communication device 1200 in accordance with previously disclosed embodiments. The first communication device 1200 comprises at least one antenna 1210; a transmitter circuit or transmitter module 1220; a receiver circuit or a receiver module 1230; a processor 1240 or a processing module or processing circuitry and a memory 1250. As shown the transmitter circuit and the receiver circuit may be comprised in a transceiver circuit or transceiver module 1260.

Antenna 1210 includes one or more antennas to transmit and/or receive radio frequency (RF) signals over the air interface. Antenna 1210 may, for example, receive RF signals from transceiver/transmitter circuit 1260 and transmit the RF signals over the air interface to one or more second communication devices e.g. UEs or radio network nodes i.e. radio base stations e.g. eNodeBs or eNBs and receive RF signals over the air interface from the one or more second communication devices e.g. radio base stations or UEs and provide the RF signals to transceiver circuit 1260.

Processing module/circuit 1240 includes a processor, microprocessor, an application specific integrated circuit (ASIC), field programmable gate array (FPGA), or the like. Processor 1240 controls the operation of the first communication device 1200 and its components. Memory (circuit or module) 1250 includes a random access memory (RAM), a read only memory (ROM), and/or another type of memory to store data and instructions that may be used by processor 1240. The first communication device 1200 may comprise additional components not shown in FIG. 12.

As previously described, the first communication device 1200 is configured to transmit by means of the transmitter circuit/module 1230 at least one burst comprising one or more subframes to one or more second communication devices; wherein the transmission of the at least one burst is preceded by a successful Listen-Before-Talk (LBT) procedure i.e. a channel is determined by the first communication device 1200 to be free to transmit the at least one burst. The receiver module or received circuitry 1220 is configured to receive, for at least one subframe in the burst, a corresponding HARQ feedback value. The HARQ feedback(s) are received from the at least one or more second communication devices. The processing module or processing circuitry or processor 1240 is configured to determine a random backoff contention window size based on each received HARQ feedback and further based on previously unused HARQ feedback available at the first communication device 1200 at the time the LBT procedure is performed to access the channel.

The memory 1250 may contain instructions executable by the processor 1240 whereby the first communication device 1200 is operative to perform the previously described method steps. There is also provided a computer program comprising computer readable code means which when run in the first communication device 1200 e.g. by means of the processor 1240 causes the first communication device to perform the above described method steps which include: to transmit at least one burst comprising one or more subframes to one or more second communication devices to receive; to receive for at least one subframe in the burst, a corresponding HARQ feedback value; and to determine a random backoff contention window size based on each received HARQ feedback and further based on previously unused HARQ feedback available at the first communication device 1200 at the time the LBT procedure is performed to access the channel.

The computer readable code means when run in the first communication device also causes the first communication device 1200 to combine, by means of the processor 1240, the received HARQ values as previously described and is also to determine, by means of processor 1240, the random backoff contention window size as previously described.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from 3GPP LTE has been used in this disclosure to exemplify the invention, this should not be seen as limiting the scope of the invention to only the aforementioned system. Other wireless systems, including LTE-A (or LTE-Advanced), UMTS, WiMax, and WILAN, may also benefit from exploiting the ideas covered within this disclosure.

ABBREVIATION EXPLANATION

CCA Clear Channel Assessment
DCF Distributed Coordination Function
DIFS DCF Inter-frame Spacing
DL Downlink
DRS Discovery Reference Signal
eNB evolved NodeB, base station
LAA Licensed Assisted Access
LBT Listen Before Talk
PDCCH Physical Downlink Control Channel
PIFS PCF Inter-frame Spacing
PCell Primary Cell
PUSCH Physical Uplink Shared Channel
QoS Quality of Service
SCell Secondary Cell
SIFS Short Inter-frame Spacing
UE User Equipment
UL Uplink

The invention claimed is:

1. A method performed by a first communication device for adapting a random backoff contention window size, comprising:
    transmitting a downlink burst to at least one second communication device;
    receiving from the second communication device, a plurality of Hybrid Automatic Repeat reQuest, HARQ, feedback values corresponding to a plurality of transmissions in the downlink burst; and
    adapting the random backoff contention window size based on the received plurality of HARQ feedback values,
    wherein the plurality of HARQ feedback values comprises at least one previously unused HARQ feedback value.

2. The method according to claim 1, wherein the transmitting is performed as a consequence of a successful Listen-Before-Talk, LBT, procedure.

3. The method according to claim 1, wherein the adapting the random backoff contention window size, denoted here as CW, is performed according to the following:
    CW is a function of the HARQ feedback values of an ordered list of past HARQ values according to:

$CW=f(HARQ_1, HARQ_2, \ldots, HARQ_K)$, where k is the number of a last HARQ feedback value in the list.

4. The method according to claim 1, wherein the adapting the random backoff contention window size comprises increasing the random backoff contention window size as a consequence of determining that a proportion of HARQ NACKs among the received plurality of HARQ feedback values is greater than or equal to a predetermined threshold.

5. The method according to claim 1, wherein the one of determining adapting the random backoff contention window size, denoted here as CW, is performed according to the following:

$CW = CWmin \times a^n$, where the multiplicative factor a is two and n denotes the number of received NACKs after the last received ACK and wherein n=floor((number of received NACKs after the last received ACK)/N), and
    where the function floor( ) returns an integer value no greater than the input n, where the window size CW is increased by the multiplicative factor a for every N NACK feedback values on average, where N is a parameter that may be used to control the aggressiveness of the LBT algorithm.

6. The method of claim 1, wherein at least one of the plurality of HARQ-ACK feedback values corresponds to a transmission in a starting subframe of a most recent transmission on a carrier for which at least some HARQ-ACK feedback is expected to be available.

7. The method of claim 6, wherein at least one of the plurality of HARQ-ACK feedback values corresponds to a transmission in a subframe other than the starting subframe.

8. The method of claim 7, wherein at least one of the plurality of HARQ-ACK feedback values corresponds to a transmission in a subframe subsequent to the starting subframe.

9. An apparatus configured to adapt a random backoff contention window size, comprising:
    processing circuitry, memory and transceiver circuitry, collectively configured to:
    transmit a downlink burst to at least one second communication device;
    receive, from the second communication device, a plurality of Hybrid Automatic Repeat reQuest, HARQ, feedback values corresponding to transmissions in the downlink burst; and
    adapt the random backoff contention window size based on the received plurality of HARQ feedback values,
    wherein the plurality of HARQ feedback values comprises at least one previously unused HARQ feedback value.

10. The apparatus according to claim 9, wherein the apparatus is configured to adapt the random backoff contention window size in a license assisted access, LAA, system comprising a primary cell and at least one secondary cell.

11. The apparatus according to claim 9, wherein the apparatus is configured to adapt the random backoff contention window size, denoted here as CW, according to the following:
    CW is a function of the HARQ feedback values of an ordered list of past HARQ values according to:

$CW=f(HARQ_1, HARQ_2, \ldots, HARQ_K)$, where k is the number of a last HARQ feedback value in the list.

12. The apparatus according to claim 9 wherein the transmission is performed as a consequence of a successful Listen-Before-Talk, LBT, procedure.

13. The apparatus according to claim 9, wherein the apparatus is configured to adapt the random backoff contention window size, denoted here as CW, according to the following:
    CW is a function of the HARQ feedback values of an ordered list of past HARQ values according to:

$CW=f(HARQ_1, HARQ_2, \ldots, HARQ_K)$, where k is the number of a last HARQ feedback value in the list.

14. The apparatus according to claim 9, wherein the apparatus is configured to adapt the random backoff contention window size, denoted here as CW, according to the following for an ith Listen-Before-Talk, LBT:

$CW(i)=f(HARQ\ ACK/NACK)$ defined as follows:

$CW(i)=CWmin$, if NACK_ratio$<T0$ $CW(i)=CW(i-1) \times a^x$, if NACK_ratio$\geq T0$ where the multiplicative factor a is 2, NACK_ratio=(number of HARQ NACKs)/(total number of available unused HARQ feedback values), T0 is a threshold that can range from 0 to 1 and x is a function of the NACK_ratio.

15. The apparatus of claim 9, wherein at least one of the plurality of HARQ-ACK feedback values corresponds to a transmission in a starting subframe of a most recent transmission on a carrier for which at least some HARQ-ACK feedback is expected to be available.

16. The apparatus of claim 15, wherein at least one of the plurality of HARQ-ACK feedback values corresponds to a transmission in a subframe other than the starting subframe.

17. The apparatus of claim 16, wherein at least one of the plurality of HARQ-ACK feedback values corresponds to a transmission in a subframe subsequent to the starting subframe.

18. The apparatus of claim 9, wherein the adapting the random backoff contention window size comprises maintaining the random backoff contention window size at a current level as a consequence of determining that a proportion of HARQ NACKs among the received at least one HARQ feedback value for the subframe and the at least one additional HARQ value is not greater than or equal to a predetermined threshold.

19. A computer readable storage medium storing computer readable code which when executed by a processing circuitry in a first communication device causes the first communication device to perform a method comprising:
   transmitting, a downlink burst to at least one second communication device;
   receiving from the second communication device, a plurality of Hybrid Automatic Repeat reQuest, HARQ, feedback values corresponding to transmissions in the downlink burst; and
   adapting a random backoff contention window size based on the received plurality of HARQ feedback values, the received plurality of HARQ feedback values including at least one previously unused HARQ feedback value available at the first communication device.

20. A method, comprising:
   performing a listen-before-talk (LBT) procedure with respect to a channel in unlicensed spectrum using a random backoff contention window size;
   transmitting a downlink burst on the channel as a consequence of the LBT procedure;
   receiving a plurality of HARQ feedback values corresponding to transmissions in the downlink burst; and
   adapting the random backoff contention window size based on the plurality of HARQ feedback values, the plurality of HARQ feedback values including at least one previously unused HARQ feedback value.

21. The method of claim 20, wherein adapting the random backoff contention window size based on the plurality of HARQ feedback values comprises:
   determining whether a proportion of HARQ-NACK values among the plurality of HARQ feedback values is greater than or equal to a threshold value; and
   increasing the random backoff contention window size as a consequence of determining that the proportion is greater than or equal to the threshold value.

22. The method of claim 20, wherein the plurality of HARQ feedback values comprise at least one HARQ feedback value corresponding to a transmission in a starting subframe of a most recent transmission on a carrier for which at least some HARQ-ACK feedback is expected to be available.

23. The method of claim 22, wherein the starting subframe of the most recent transmission is a starting subframe of the downlink burst.

24. The apparatus of claim 23, wherein the plurality of HARQ feedback values further comprise at least one HARQ feedback value for a subframe subsequent to the starting subframe.

25. The method of claim 22, wherein the plurality of HARQ feedback values further comprise at least one HARQ feedback value for a subframe subsequent to the starting subframe.

26. An apparatus, comprising:
   processing circuitry, memory and transceiver circuitry collectively configured to:
   perform a listen-before-talk (LBT) procedure with respect to a channel in unlicensed spectrum using a random backoff contention window size;
   transmit a downlink burst on the channel as a consequence of the LBT procedure;
   receive a plurality of HARQ feedback values for the downlink burst; and
   adapt the random backoff contention window size based on the plurality of HARQ feedback values, the received plurality of HARQ feedback values including at least one previously unused HARQ feedback value.

27. The apparatus of claim 26, wherein adapting the random backoff contention window size based on the plurality of HARQ feedback values comprises:
   determining whether a proportion of HARQ-NACK values among the plurality of HARQ feedback values is greater than or equal to a threshold value; and
   increasing the random backoff contention window size as a consequence of determining that the proportion is greater than or equal to the threshold value.

28. The apparatus of claim 26, wherein the plurality of HARQ feedback values comprise at least one HARQ feedback value for a starting subframe of a most recent transmission on a carrier for which at least some HARQ-ACK feedback is expected to be available.

29. The apparatus of claim 28, wherein the starting subframe of the most recent transmission is a starting subframe of the downlink burst.

30. A method performed by a first communication device for adapting a random backoff contention window size, comprising:
   transmitting a downlink burst to at least one second communication device;
   receiving from the second communication device, a plurality of Hybrid Automatic Repeat reQuest, HARQ, feedback values corresponding to a plurality of transmissions in the downlink burst; and
   adapting the random backoff contention window size based on the received plurality of HARQ feedback values, wherein the adapting the random backoff contention window size comprises maintaining the random backoff contention window size at a current level as a consequence of determining that a proportion of HARQ NACKs among the received at least one HARQ feedback value for the subframe and the at least one additional HARQ value is not greater than or equal to a predetermined threshold.

* * * * *